United States Patent Office 3,574,173
Patented Apr. 6, 1971

3,574,173
POLY(THIOL ANHYDRIDES)
Walter Stamm, Tarrytown, N.Y., assignor to Stauffer Chemical Company, New York, N.Y.
No Drawing. Filed Sept. 18, 1968, Ser. No. 760,699
Int. Cl. C08g 25/00
U.S. Cl. 260—79
5 Claims

ABSTRACT OF THE DISCLOSURE

Novel poly(thiol anhydrides) are provided having the formula:

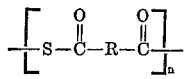

wherein R is a divalent aliphatic hydrocarbon radical consisting essentially of hydrogen and carbon and $n$ is an integer representing the number of repeating units. Polymer compositions are also provided comprising vinyl type polymers containing the novel thio anhydride compositions of this invention as stabilizers therefor.

---

The present invention relates to novel poly(thiolcarboxylic anhydrides) and stable vinyl polymer compositions containing the same.

The novel compositions of this invention are useful as thermal stabilizers for vinyl-type resins and are additionally useful as coating materials.

As is well known, the vinyl-type resins, such as polyvinyl chloride, polyvinylidene chloride, polyethylene, polypropylene, vinyl chloride/vinyl acetate copolymer, and the like, require thermal stabilization. This is generally accomplished through the provision of an additive which serves to stabilize the polymer system. Many different types of additives have been proposed for this use, primarily metallic salts, and many of these have served effectively. In certain instances, however, difficulty is encountered in admixing stabilizers to the polymeric system; in others, compatibility problems arise. Invariably, the stabilizing material is leachable from the polymer system, and this can limit its application.

The compositions of the present invention are polymeric in nature and accordingly are highly compatible with polymer systems and are easily admixed therewith. Additionally, since they are polymeric in nature, they are relatively resistant to leaching, and yet provide effective thermal stabilization.

In accordance with the present invention, a new thermoplastic polymeric composition of matter is provided containing the repeating unit:

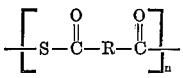

Formula I wherein R is a divalent aliphatic hydrocarbon radical conconsisting essentially of hydrogen and carbon and $n$ is an integer representing the number of repeating units.

Illustrative of the divalent aliphatic groups represented by R above are the divalent alkanes containing from about 4 to about 12 carbon atoms, inclusive, such as butane, pentane, hexane, heptane, octane, nonane, decane, unedcane, dodecane, tridecane, tetradecane, pentadecane, hexadecane, and the like. The alkane base has been employed above to facilitate nomenclature. It is of course understood that the divalency of the alkane base can occur at any position in the alkane molecule.

In each instance, as defined above, R contains from about 4 to about 12 carbon atoms, inclusive. The aliphatic groups can also contain sites of olefinic unsaturation.

The term "hydrocarbon radical consisting essentially of hydrogen and carbon" as used herein is intended to include those radicals containing hydrogen and carbon, but which also can contain or have substituted thereon other moieties such as nitrogen, oxygen and sulfur and the halogens which are inert and non-reactive and do not substantially affect the nature of the polymer.

In Formula I above, it will be appreciated that the illustration is not terminated. These polymers are, in fact, of course terminated by either terminating groups such as hydrogen, thiol, halogen, hydroxyl or the like depending upon the particular techniques employed in the preparation of the polymer as is well known in the art.

In this formula, $n$ represents an integer which indicates the number of repeating units. Again, depending upon reaction conditions, this value can be relatively low, i.e., from about 3 to about 25 or can extend at the high level from about 100 to about 10,000. While it is intended in this invention to include values of from about 3 to about 10,000, it is preferred to employ those polymers having from about 25 to about 1,000 repeating units as these polymers exhibit greater compatibility. Additionally, these polymers exhibit properties generally characteristic of polymers, i.e., capable of forming a film, and thus enjoy a wider variation in utility.

The polymers of this invention can be prepared by reacting a diacyl halide of the formula:

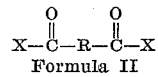

Formula II wherein X is a halogen, such as fluorine, chlorine, bromine or iodine, and wherein chlorine is preferred, and wherein R has been previously defined, with hydrogen sulfide. These diacyl halides, chlorides being employed hereinafter as illustrative, are prepared by reacting a corersponding dicarboxylic acid, i.e., wherein X is substituted with OH in Formula II above, in the presence of a typical chemical agent capable of converting the acid to the acyl halide. Typical of such agents are phosphorus trichloride, phosphorus oxychloride, sulfur oxychloride, sulfur dioxychloride, phosgene, and the like. The preparation of these compounds is, however, well known in the art and needs little elaboration here. It is of course appreciated that mixtures of diacyl halides can be employed to prepare polymers containing differing —R— groups.

The particular technique employed in the preparation of the polymers of this invention is dependent to some degree upon the characteristics of the precursor, diacyl chloride. If, for example, this compound is a liquid, it can be employed directly and hydrogen sulfide can be bubbled through the liquid; if it is of relatively high molecular weight and solid in nature, it can be dissolved in a suitable solvent and hydrogen sulfide can be again bubbled through it in concentrated or dilute form.

Hydrogen sulfide is reacted with the diacyl dihalide in stoichiometric amounts, i.e., one mole of hydrogen sulfide with one mole of diacyl dihalide, although excesses of hydrogeen sulfide can be employed if desired and are preferred.

The reaction is generally conducted at a temperature of from about −60° C. to about 200° C., although preferred temperatures differ widely, depending on the specific preparative method employed.

The reaction can be conducted at atmospheric pressure, superatmospheric pressure, or subatmospheric pressure. It is, however, preferred to conduct the reaction in most instances at atmospheric pressure as this avoids expensive specialized equipment necessary for employing hydrogen sulfide under elevated pressure. When solvents are employed, suitable solvents include aliphatic hydrocarbons, aromatic hydrocarbons, halogenated hydrocarbons, carbon bisulfide, ethers, thioethers, ketones, thioketones, nitroparaffins, acylated amines, amides and the like. The solvents employed should, of course, be inert in respect to the reactants and product. It will be appreciated that "interfacial" reaction techniques can be employed by using two immiscible solvents.

The reaction proceeds as set forth below:

Formula III

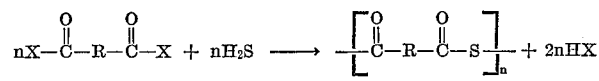

In this reaction, it will be noted that a hydrogen halide HX is given off. To achieve a fast rate of reaction, a high molecular weight and a relatively pure polymeric product, the hydrogen halide should be either removed from the reaction vessel by mechanical means or be bound chemically or physically. The hydrogen halide can be removed continuously or periodically by blowing through the reaction medium with nitrogen, by applying a vacuum to the reaction system. Or it can be bound chemically by employing an acid acceptor, such as sodium carbonate, calcium carbonate, sodium bicarbonate, pyridine or other terteriary amines alone or in mixtures in either stoichiometric or catalytic amounts. Or it can be bound physically by using clays, molecular sieves and the like. However, as indicated, this reaction can be run effectively without such acid acceptors. Also it will be appreciated that sodium sulfide and other metallic sulfides can be employed in the reaction in place of hydrogen sulfide.

After the reaction has been run, the polymer is recovered, generally as a solid from the reaction medium.

As indicated above, preferred diacyl dihalides employed are the aliphatic diacyl dichlorides. Acids which are particularly useful for preparing these acyl halides are glutaric, adipic, pimelic, suberic, azelaic, sebacic, dodecanedioic acid, and brassylic acids. Most preferred of these are adipic acid, azelaic acid and dodecanedioic acid.

It is, of course, understood that variations within the context of this invention are permissible and are intended to be included herein. For example, polymers can be prepared employing mixtures of diacyl halides to provide variations in polymer units. In certain instances, this can be desirable to provide particular characteristics to the polymer being made.

As indicated earlier, the polymers of this invention are particularly useful as stabilizers for vinyl-type polymers.

By the term "vinyl polymers" is intended polymers containing polymerized vinyl monomers having the structure:

$$>C=C<$$

Such monomers generally contain from about 2 to about 20 carbon atoms, inclusive, and can be illustrated by the following:

Lower α-olefin monomers such as ethylene, propylene, butene, and the like; the aromatic vinyl monomers such as styrene, α-methyl styrene, chlorostyrene, and the like; vinyl and vinylidene halides such as vinyl chloride, vinyl fluoride, vinylidene chloride, vinylidene bromide, and the like; vinyl esters such as vinyl formate, vinyl acetate, vinyl propionate, vinyl butyrate, vinyl chloroacetate, vinylchloropropionate, and the like; acrylic and alphaalkyl acrylic acids, their amides, and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-di-methylacrylamide, methacrylamide, N-methyl methacrylamide, N,N-dimethylmethacrylamide, acrylonitrile, chloro-acrylonitrile, methacrylonitrile, ethacrylonitrile, and the like; maleic and fumaric acids, and their esters such as dimethyl maleate, diethyl maleate, monobutyl maleate and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, and the like; N-methyl-N-vinyl acetamide, N-vinyl carbazone, N-vinyl pyrrolidone, ethyl methylene malonate and the like.

The term "vinyl polymers" is intended to include both homopolymers of such vinyl monomers as well as the vinyl copolymers formed by the interpolymerization of two or more of the copolymerized vinyl monomers.

Preferred of the vinyl polymers is polyvinyl chloride and the vinyl chloride copolymers such as vinyl chloride/vinyl acetate copolymer, vinyl chloride/acrylonitrile copolymer, and the like, as well as blends of such polymers.

When the polymers of this invention are employed as stabilizers in the vinyl-type polymers, they are generally employed in a stabilizing amount. This is generally of from about 0.1% by weight of the vinyl resin to about 10% by weight, although larger amounts can be employed, if desired. Effective stabilization can generally be achieved from about 0.5% to about 5% by weight of the vinyl polymer.

In the examples which follow and throughout the specification, all parts and percentages are by weight unless otherwise indicated.

EXAMPLE I

Poly(thioladipic anhydride)

A reactor equipped with stirrer and reflux condenser is charged with: 90 parts by weights of adipoyl dichloride (B.P. 140° C./20 mm. Hg) dissolved in about 300 parts of diethyl ether; and about 86 parts of sodium bicarbonate dissolved in 500 parts of water. At 20° C. hydrogen sulfide is continuously bubbled into the reactor through an inlet tube reaching to the bottom of the reactor. The two-phase system is stirred vigorously. The batch temperature rises to approximately 35° C. when ether beings to reflux and a white solid product precipitates. After about 5 hours, most of the ethyl ether is evaporated and the solid reaction product is isolated by filtration. It is washed with fresh water, ether and air-dried. Iodine-titrimetic and IR-spectrographic analyses exhibit the characteristic thiolanhydride groups present in high yield, and the substantial absence of dithioadipic acid.

EXAMPLE II

Poly(thiolazelaic anhydride)

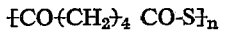

Dissolved in 250 parts of dry benzene are 112 parts of azeloyl dichloride, B.P. 182–186° C. at 40 mm. Hg. The reactor is equipped with a stirrer and a reflux condenser. A small amount of pyridine (about 5 parts) is added, and then hydrogen sulfide is bubbled through the homogeneous agitated solution. The temperature is slowly raised to reflux of the benzene thereby removing liberated hydrogen chloride through the reflux condenser into a Dry Ice trap for recovery. A total of about 100 parts of hydrogen sulfide is slowly passed through the solution. A white product precipitates as the reaction proceeds. After about four hours, approximately one-half of the benzene solvent is removed by distillation. The solid, polymeric, reaction product is isolated and purified by centrifugation, thoroughly washing with water, ether, and drying. Elemental and spectral analyses confirm the proposed structure.

EXAMPLE III

Poly(dodecanedioic acid thiol anhydride)

Hydrogen sulfide is sparged through molten and agitated dodecanedioic acid dichloride at about 60°–70° C. for seven hours. The mixture slowly solidifies as the reaction progresses. The crude poly(thiol anhydride) is obtained directly by this method.

EXAMPLE IV

One-hundred parts of commercial polyvinyl chloride resin are thoroughly blended with 20 parts of dioctyl phthalate plasticizer, 0.5 part of stearic acid lubricant and 2.5 parts of the reaction product of Example II at 90° C. This blend is brought onto a mill having chromium plated rolls operating at a temperature of 165° C. Milling of the fluid film is continued for 30 minutes at 165° C., during which time the vinyl resin remains practically colorless. At room temperature the resulting PVC film is fairly stiff and colorless. It is useful in many applications, including the manufacture of packaging material.

What is claimed is:

1. A poly(thiolcarboxylic anhydride) having the structure:

wherein R is a divalent aliphtic hydrocarbon radical consisting essentially of hydrogen and carbon and containing from about 4 to about 12 carbon atoms inclusive, and $n$ is an integer having a value of from about 3 to about 10,000.

2. The composition of claim 1, wherein $n$ is an integer having a value from about 25 to about 1,000.

3. The composition of claim 1, wherein R is a tetramethylene group.

4. The composition of claim 1, wherein R is a heptamethylene group.

5. The composition of claim 1, wherein R is a decamethylene group.

References Cited

UNITED STATES PATENTS

| 3,254,061 | 5/1966 | Martin et al. | 260—79 |
| 3,278,352 | 10/1966 | Erickson | 149—19 |

DONALD E. CZAJA, Examiner

M. I. MARQUIS, Assistant Examiner

U.S. Cl. X.R.

260—45.7, 79.1, 609, 897, 899

PO-1050
(5/69)

UNITED STATES PATENT OFFICE
CERTIFICATE OF CORRECTION

Patent No. 3,574,173          Dated April 6, 1971

Inventor(s) Walter Stamm

It is certified that error appears in the above-identified patent and that said Letters Patent are hereby corrected as shown below:

Column 4, line 51, "$-[CO(CH_2)CO-S]_n-$" should read -- $-[CO(CH_2)_7CO-S]_n-$ --.

Column 5, line 21, -aliphtic" should read --aliphatic-- .

Signed and sealed this 24th day of August 1971.

(SEAL)
Attest:

EDWARD M. FLETCHER, JR.
Attesting Officer

WILLIAM E. SCHUYLER, JR.
Commissioner of Patents